July 4, 1933.  S. N. ELLIOTT  1,916,786
CLUTCH DEVICE
Filed Nov. 28, 1930  2 Sheets-Sheet 1

Inventor
S. N. Elliott
By Clarence A. O'Brien
Attorney

July 4, 1933.  S. N. ELLIOTT  1,916,786
CLUTCH DEVICE
Filed Nov. 28, 1930  2 Sheets-Sheet 2

Inventor
S. N. Elliott
By Clarence A. O'Brien
Attorney

Patented July 4, 1933

1,916,786

UNITED STATES PATENT OFFICE

SETH N. ELLIOTT, OF MARINE, ILLINOIS

CLUTCH DEVICE

Application filed November 28, 1930. Serial No. 498,805.

This invention relates to clutch devices and has more particular reference to an automatic clutch means for effecting a driving connection between the tread or traction wheels and the revolving cutter shaft of a lawn mower for setting the revolving cutter into operation when the mower is moved in one direction, and for effecting a disengagement of the drive connection when the lawn mower is moved in an opposite direction whereby the revolving cutter is permitted to idle.

A still further object of the invention is to provide a clutch for connecting the driven pinion to the shaft of the revolving cutting reel that is less susceptible of wear than similar devices heretofore used, and which further will effect a positive and efficient drive between the traction or tread wheel and the shaft of the revolving cutter as well as to insure a thorough disconnection between the pinion and the shaft of the revolving cutter reel when the traction wheels are rotated in an opposite direction.

Other objects and advantages of the invention will become apparent during a study of the following description taken in connection with the accompanying drawings wherein.

Figure 1:
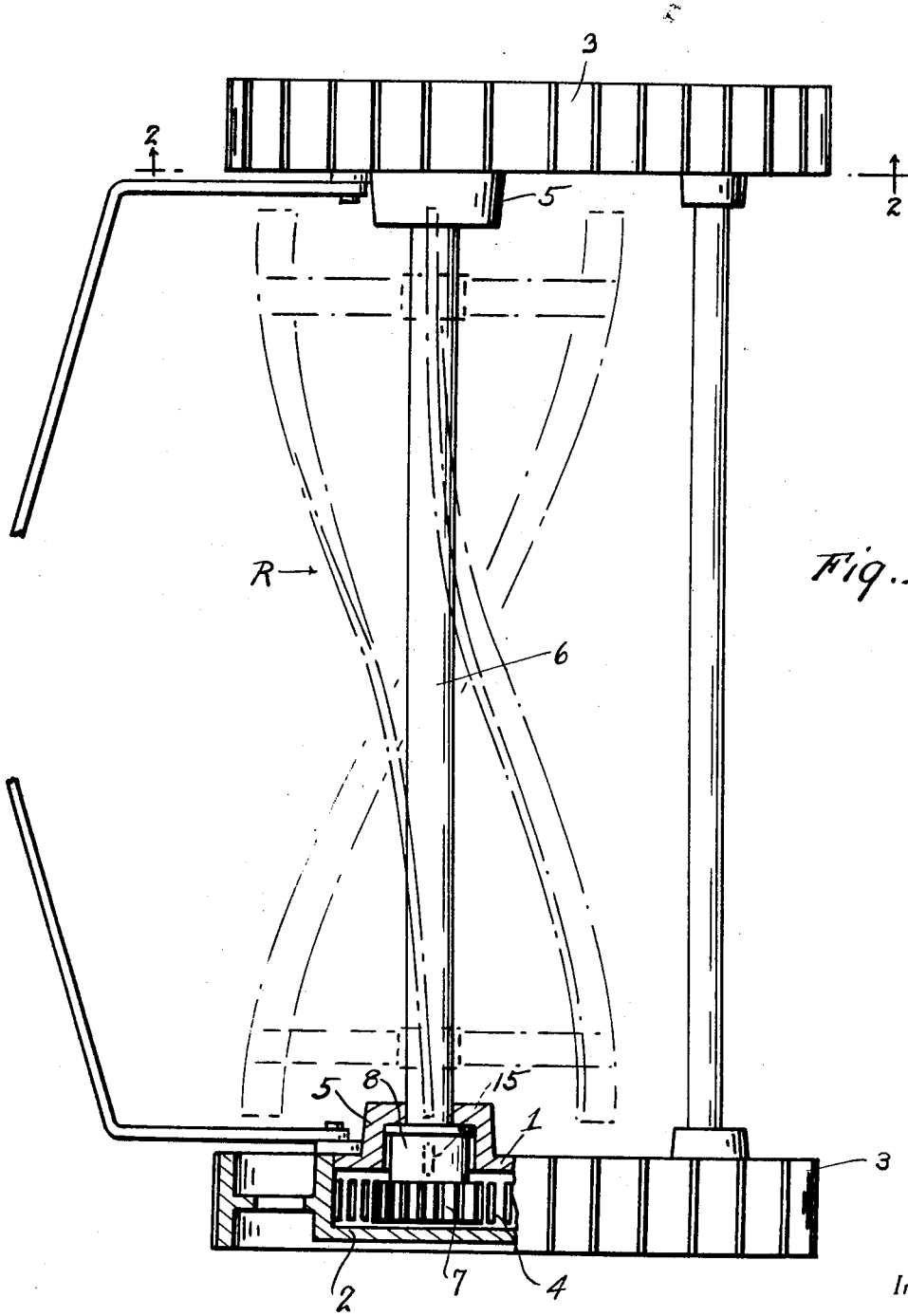
Figure 1 is a top plan view of a portion of a lawn mower, certain parts being broken away for illustrating the application of the invention therewith.

In the drawings 1 indicates the end plate closing the gear casing 2 of the lawn mower traction or tread wheel 3.

The traction wheels 3 are provided with the usual internal gears 4, and the end plates 1 are provided with the usual bearings 5 in which are journalled the ends of the shaft 6 of the revolving cutter reel designated generally by the reference character R, and the blades of which are shown in broken lines in Figure 1.

On the ends of shaft 6 are pinions 7 meshing with the gear wheels 4 and respectively provided with a hub extension 8 accommodated in the bearing 5.

Each of the pinions 7 is loosely mounted on the shaft 6, and the hub 8 of the respective pinion is provided with internal ratchet teeth 9, which teeth 9 are each provided with a notch or recess 10 extending transversely of the ratchet tooth whereby to provide lugs 11 extending substantially parallel to the axes of the hub extension. The shaft 6 at each end thereof is provided with a transverse opening or bore 12, non-circular in cross section and having slidable therein transversely of the shaft 6 a clutch pin 13 that is also non-circular in cross section. The clutch pin 13 is provided at one end thereof with a hook shaped extension 14 for engagement with one of the lugs 11 for keying the pinion to the shaft 6 to transmit the movement of the wheels 3 to the shaft 6 for revolving the cutter R when the lawn mower is moved in one direction for effecting a cutting of the grass or the like in the usual manner.

The clutch pin 13 is normally urged outwardly of the bore 12 for projecting said hooked end 14 into the path of the lugs 11, through the medium of a coil spring 15. The clutch pin 13 is provided with a semi-cylindrical bore or recess 16 disposed oppositely to a like bore or recess 17 provided in the shaft 6 and said bores or recesses 16 and 17 cooperate to provide a cylindrical pocket for accommodating the coil spring 15. Adjacent that end of the recess 16 nearest to the hook projection 14, the clutch pin is provided with a lug 18 against which one end of the spring 15 impinges, and the opposite end of the spring 15 engages a projection 19 integral with the shaft 6 and extending into the recess 16.

That end of the clutch pin 13 remote from the hook projection 14 is beveled or curved as at 20.

Figure 2:
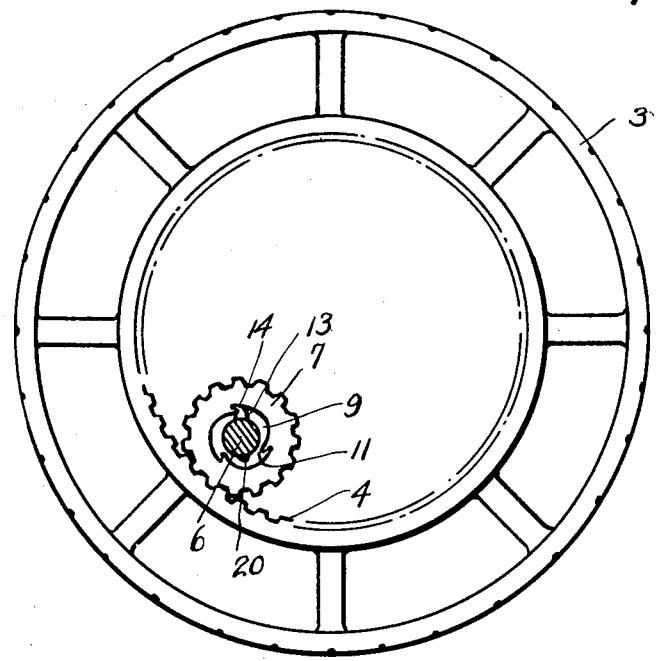
Figure 2 is a sectional view taken substantially on the line 2—2 of Figure 1.
Figure 3:
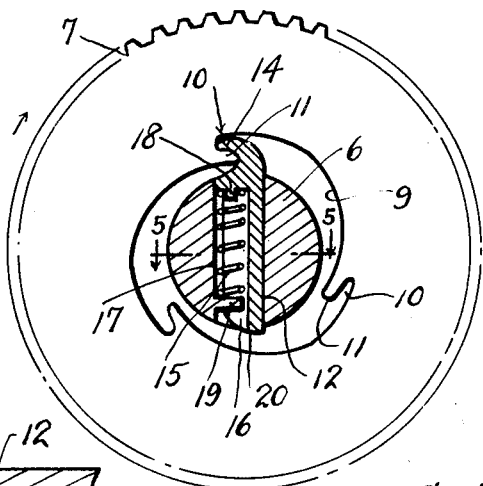
Figure 3 is a transverse sectional view taken through the reel shaft and hub of the pinion for clearly illustrating the clutch means comprehended by the present invention.
Figure 5:
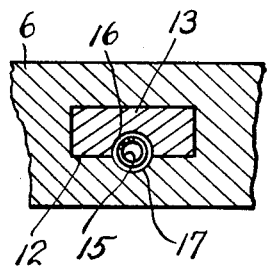
Figure 5 is a fragmentary detail sectional view taken substantially on the line 5—5 of Figure 3.
Figure 4:
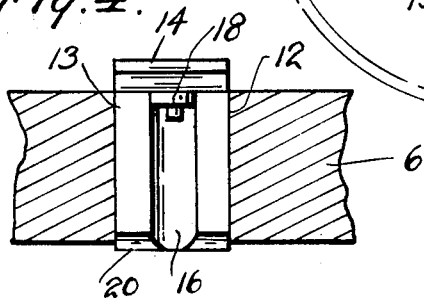
Figure 4 is a fragmentary longitudinal sectional view taken through the reel shaft with the clutch pin arranged in the opening provided therefor in the shaft, the clutch pin being shown in elevation.

From a study of Figure 2, it will be seen that when the lawn mower is pushed forwardly, or in a direction toward the right in Figure 2, the internal gear 4 meshing with the pinion 7 will rotate the pinion 7, and the hook 14 projected radially of the shaft 6, will be engaged by one of the lugs 11 with the bill of the hook received in the notch 10 provided in the ratchet tooth 9 of which that particular lug forms a part. Thus the pinion 7 is connected to the shaft 6 for rotating the shaft and the cutting reel of the lawn mower carried thereby.

When the direction of rotation of the wheels 3 is reversed, that is when the wheels 3 are rotated in a direction toward the left in Figure 2, the particular lug 11 will move out of engagement with the hook 14 thus disengaging the hub 8 of the pinion from the shaft 6 so that the pinions 7 driven from the gear wheels 4 will rotate idly relative to the shaft 6 without effecting rotation of the latter.

As the pinion 7 thus rotates relative to the shaft 6, the clutch pin 13 will be moved inwardly against the action of the spring 13 as the arcuate faces of the ratchet teeth 9 engage with the rounded outer end of the clutch pin at that end of the clutch pin provided with the hook projection 14 so that little or no material resistance will be offered.

In providing the ratchet teeth with lugs, and the clutch pin with the hook extension, it will be apparent that I have provided means for effecting a positive connection between the pinion hub and the shaft of the revolving cutter and which will at the same time permit of a quick disconnection between the shaft and the hub of the pinion upon reverse movement of the traction or tread wheel of the lawn mower. Further, it will be apparent that such a structure is less susceptible to wear than such clutch means now in use on lawn mowers for the same purpose, which clutch structure now in use, for the most part, comprises clutch pins having round or squared ends that merely abut the ratchet teeth, and consequently do not effect a positive connection between the ratchet tooth and the end of the clutch pin as is the case in the present invention.

Even though I have herein shown and described the preferred embodiment of the invention, it is to be understood that the same is susceptible of various changes, improvements and modifications coming within the scope of the appended claims.

Having thus described my invention, what I claim as new is:

1. A clutch device including in combination a driving member and a driven member, a clutch pin on the driven member constrained to shift radially relative thereto, yieldable means normally urging the pin in one direction, and said driving member provided with a circular series of relatively spaced notches, and a hook on one end of the pin arranged normally in the path of the notches for positive engagement therewith.

2. A clutch device including in combination a driving member and a driven member, a clutch pin on the driven member and constrained to shift radially thereof, a circular series of ratchet teeth provided on the driving member and respectively provided with a notch, and an integral hook projection on one end of the pin and arranged to engage the ratchet teeth with the bill of the hook engaging in the notch of the ratchet tooth engaged by said hook.

3. In a lawn mower of the type including a rotatably mounted reel shaft having a driven pinion loose thereon; a clutch device comprising a clutch pin adapted for slidable reception in a transverse opening provided in the reel shaft, said pin being provided with a groove on one side thereof, a fixed projection within said opening and engaging said groove, a lug on said pin on the grooved side thereof, a spring arranged in said opening between said projection and lug and normally urging said pin in one direction radially to said shaft, a circular series of notched ratchet teeth on said pinion, and an integral hook projection on one end of the pin and arranged in the path of the notched teeth for positive engagement therewith upon rotation of the shaft in one direction.

In testimony whereof I affix my signature.

SETH N. ELLIOTT.